US011292013B2

(12) United States Patent
Erdmann et al.

(10) Patent No.: US 11,292,013 B2
(45) Date of Patent: *Apr. 5, 2022

(54) TURBINE AND LIQUID SEPARATOR

(71) Applicants: REINZ-DICHTUNGS-GMBH, Neu-Ulm (DE); 3NINE AB, Nacka Strand (SE)

(72) Inventors: Christoph Erdmann, Ulm (DE); Petr Polednak, Neu-Ulm (DE); Francesco Zitarosa, Illertissen (DE)

( * ) Notice: Subject to any disclaimer, the term of this patent is extended or adjusted under 35 U.S.C. 154(b) by 448 days.

This patent is subject to a terminal disclaimer.

(21) Appl. No.: 16/336,746

(22) PCT Filed: Sep. 28, 2017

(86) PCT No.: PCT/EP2017/074579
§ 371 (c)(1),
(2) Date: Mar. 26, 2019

(87) PCT Pub. No.: WO2018/060303
PCT Pub. Date: Apr. 5, 2018

(65) Prior Publication Data
US 2020/0298252 A1 Sep. 24, 2020

(30) Foreign Application Priority Data
Sep. 28, 2016 (DE) .................... 20 2016 105 408.7

(51) Int. Cl.
*B04B 5/00* (2006.01)
*B01D 19/00* (2006.01)
(Continued)

(52) U.S. Cl.
CPC .......... *B04B 5/005* (2013.01); *B01D 19/0052* (2013.01); *B04B 5/12* (2013.01); *B04B 9/06* (2013.01); *F01M 13/04* (2013.01); *B04B 2005/125* (2013.01); *F01M 2013/0422* (2013.01)

(58) Field of Classification Search
CPC .. B04B 5/005; B04B 5/12; B04B 9/06; B04B 2005/125; B01D 19/0052; F01M 13/04; F01M 2013/0422
See application file for complete search history.

(56) References Cited

U.S. PATENT DOCUMENTS 5,507,622 A * 4/1996 Avny ...................... F16H 41/28
416/180
6,668,539 B2 12/2003 Schlote
(Continued)

FOREIGN PATENT DOCUMENTS

DE 202007008081 U1 * 10/2008 ............... B04B 9/06
DE 202007008081 U1 10/2008
(Continued)

OTHER PUBLICATIONS

European Patent Office, International Search Report with Written Opinion, issued in PCT/EP2017/074579, dated Nov. 21, 2017, 11 pages, European Patent Office, Rijswijk, Netherlands.
(Continued)

Primary Examiner — Robert Clemente

(57) ABSTRACT

A turbine having a turbine wheel, as used for example as a drive for active oil separators, and to a liquid separator using the turbine is described.

13 Claims, 14 Drawing Sheets

(51) Int. Cl.
    *B04B 5/12*         (2006.01)
    *B04B 9/06*         (2006.01)
    *F01M 13/04*      (2006.01)

(56)            References Cited

U.S. PATENT DOCUMENTS

| | | |
|---|---|---|
| 6,996,971 B2 | 2/2006 | Schlote |
| 6,997,674 B1 | 2/2006 | Johnson |
| 7,314,347 B2 | 1/2008 | Johnson |
| 8,714,132 B2 | 5/2014 | Baumann et al. |
| 2010/0180854 A1* | 7/2010 | Baumann ................ B04B 5/005 |
| | | 123/196 A |

FOREIGN PATENT DOCUMENTS

| | | |
|---|---|---|
| DE | 202007009913 U1 | 11/2008 |
| EP | 2020485 A2 | 2/2009 |

OTHER PUBLICATIONS

Cover page of the earliest claimed German priority document with German Search Report citations and a detailed citation list.

\* cited by examiner

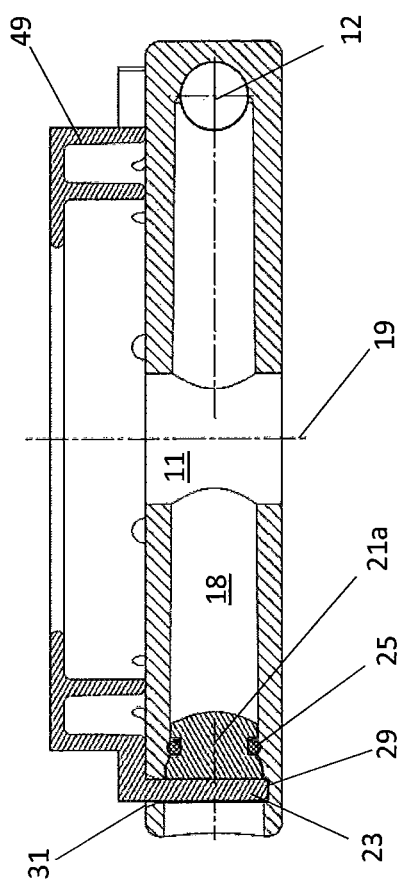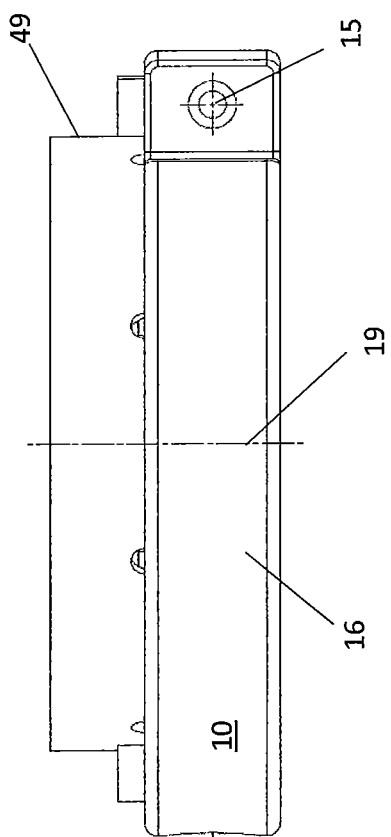

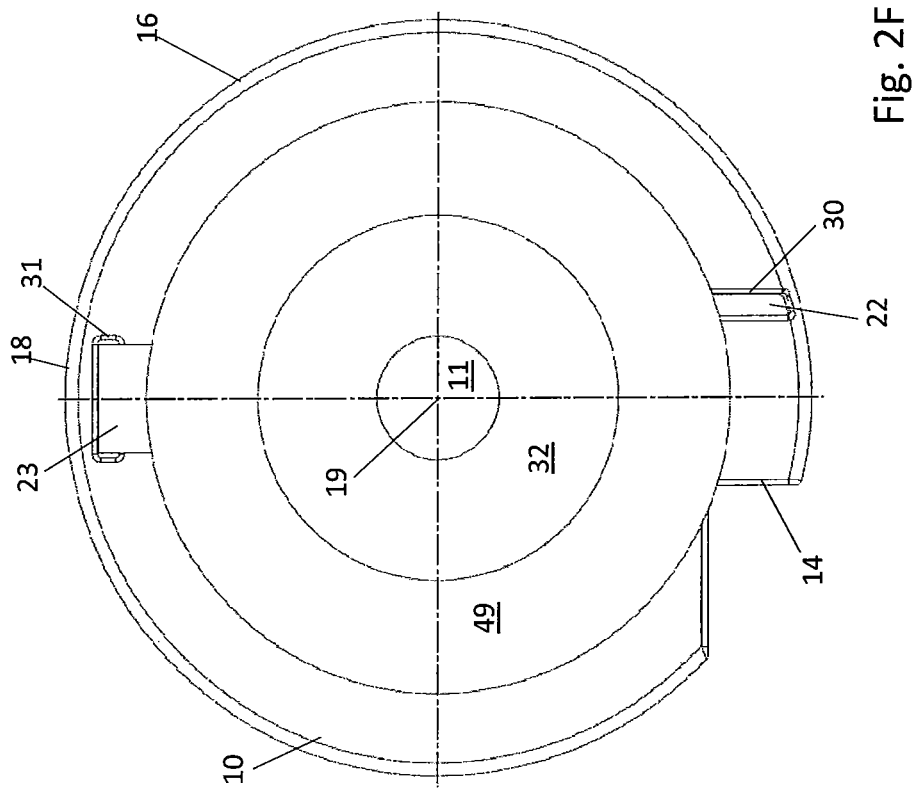
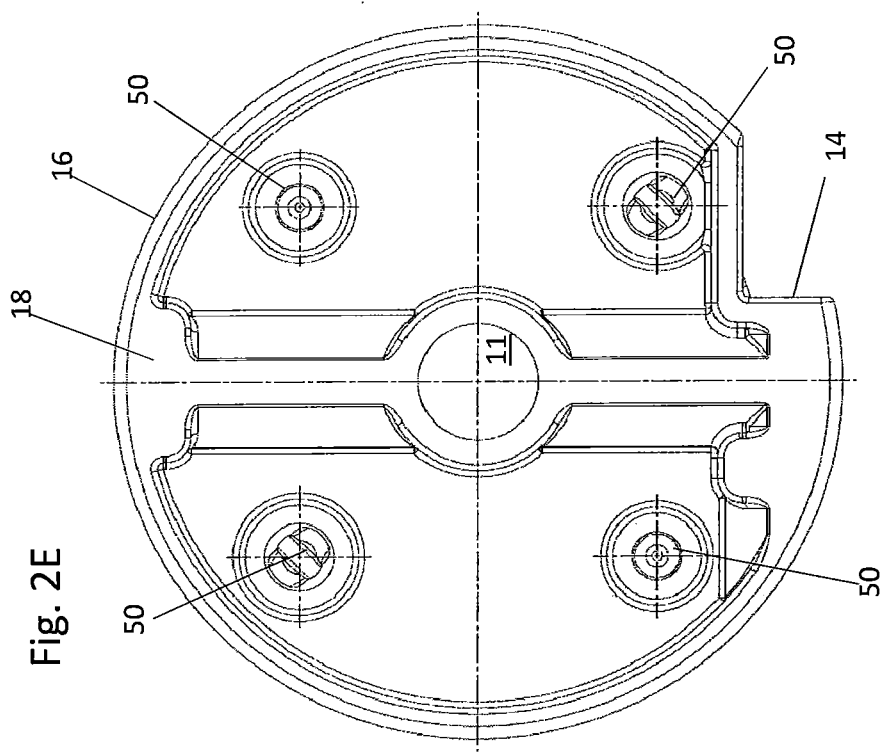

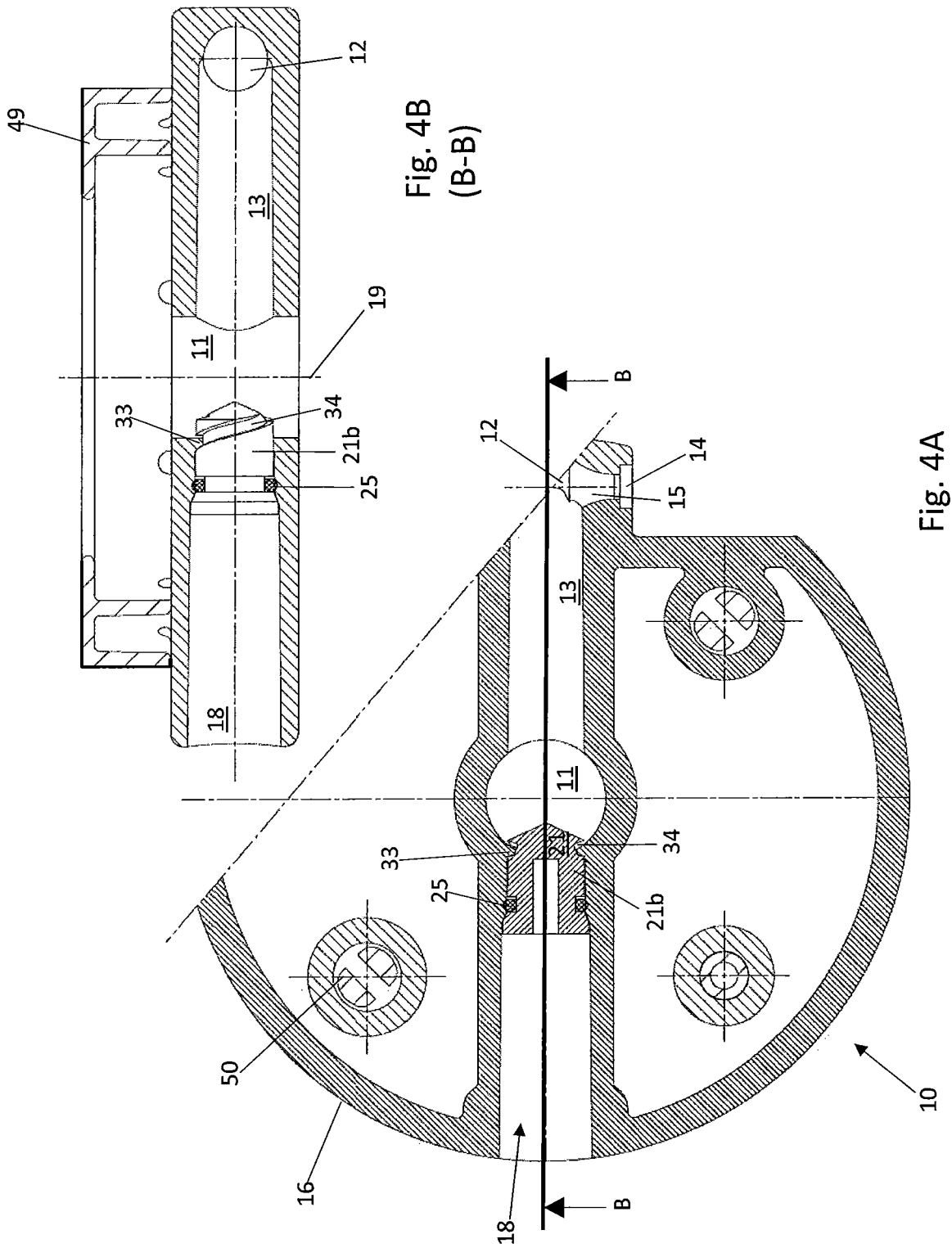

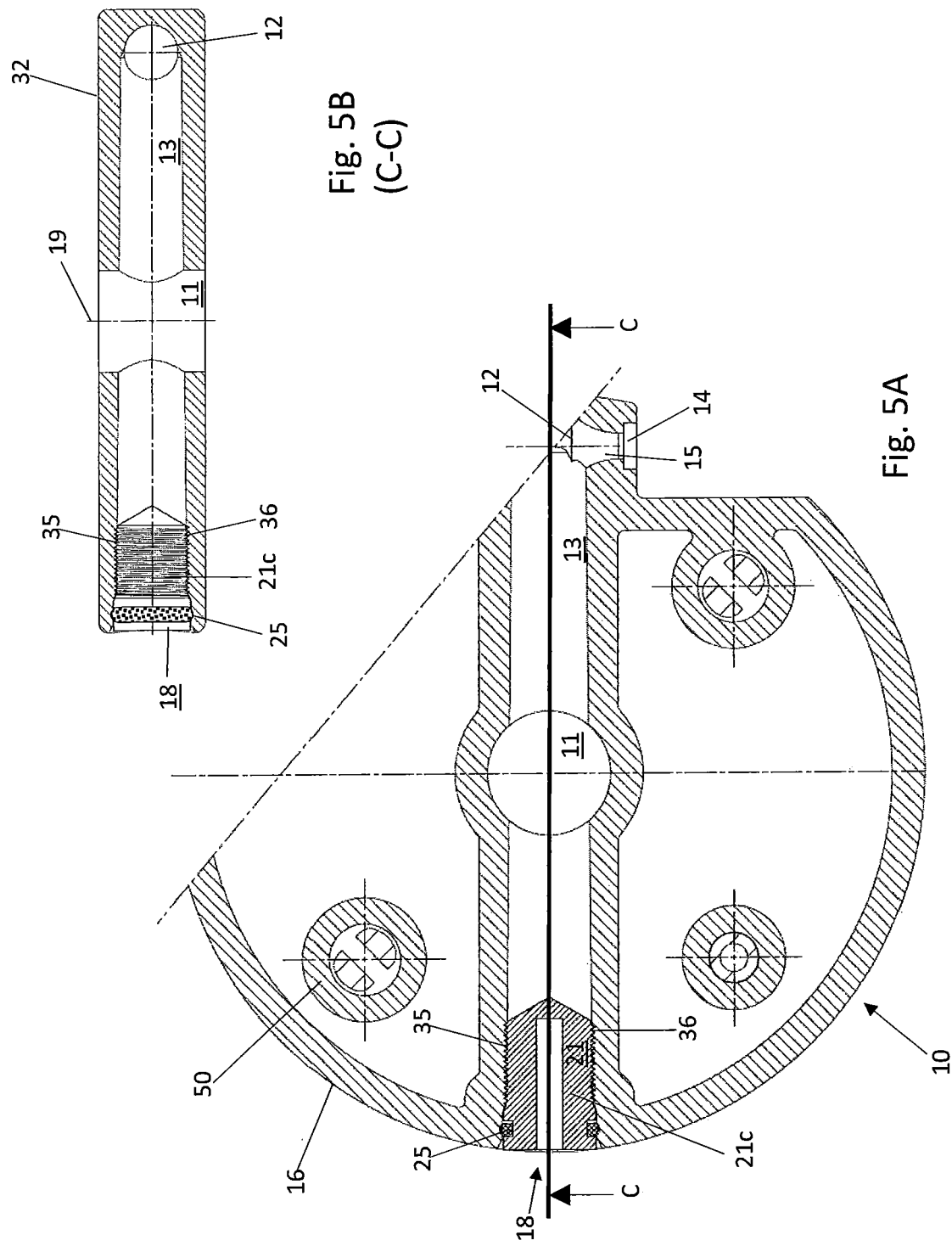

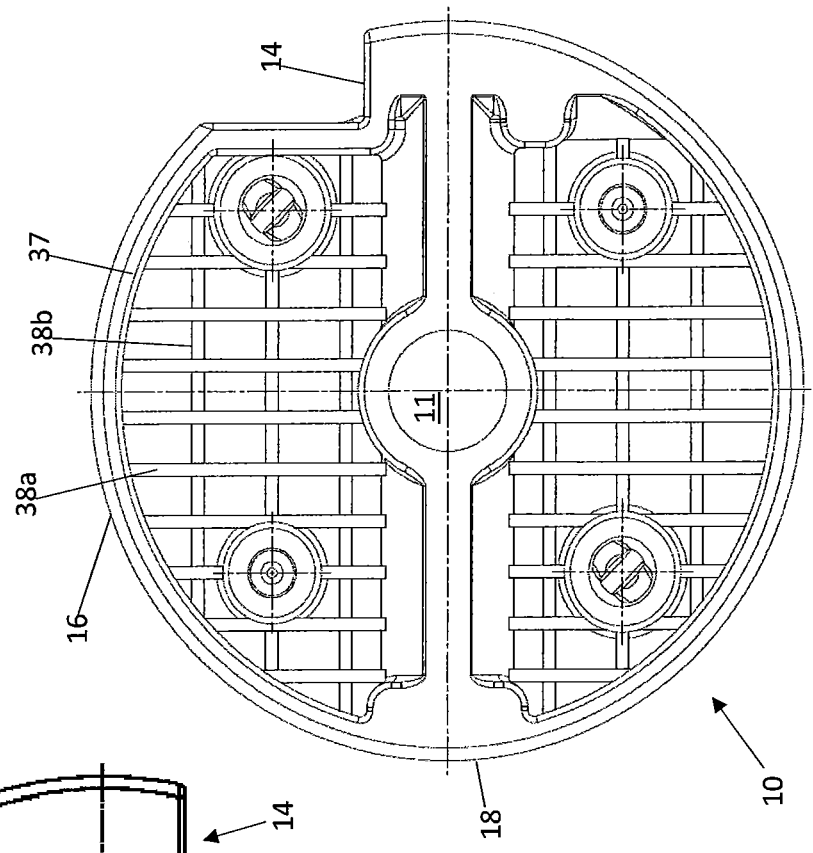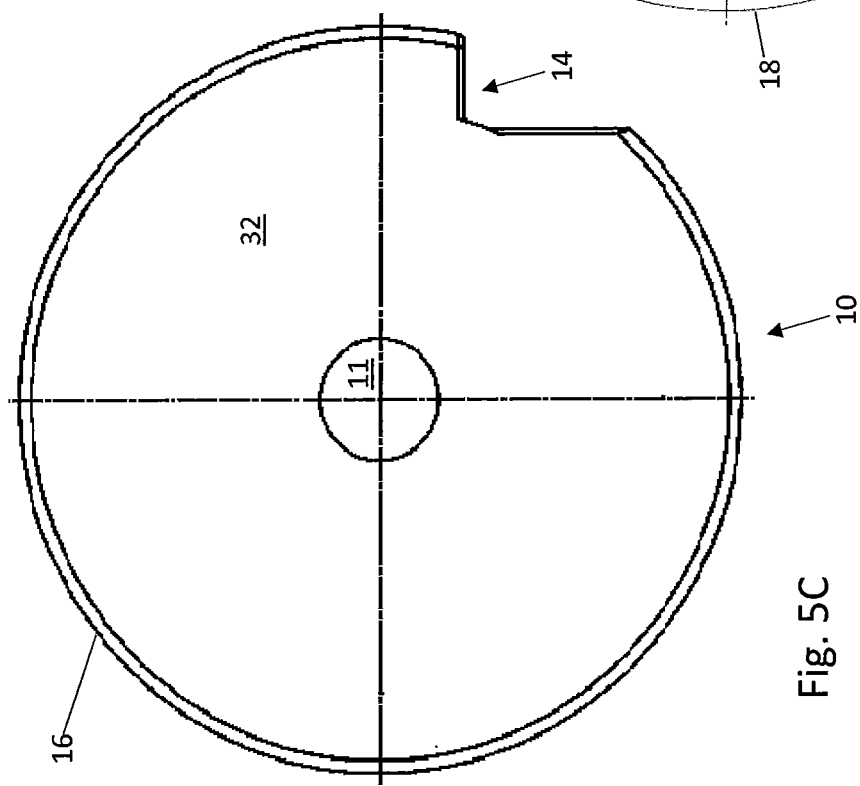

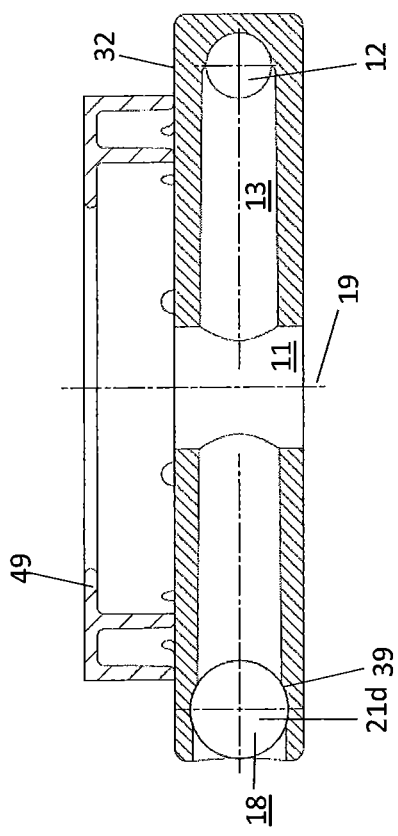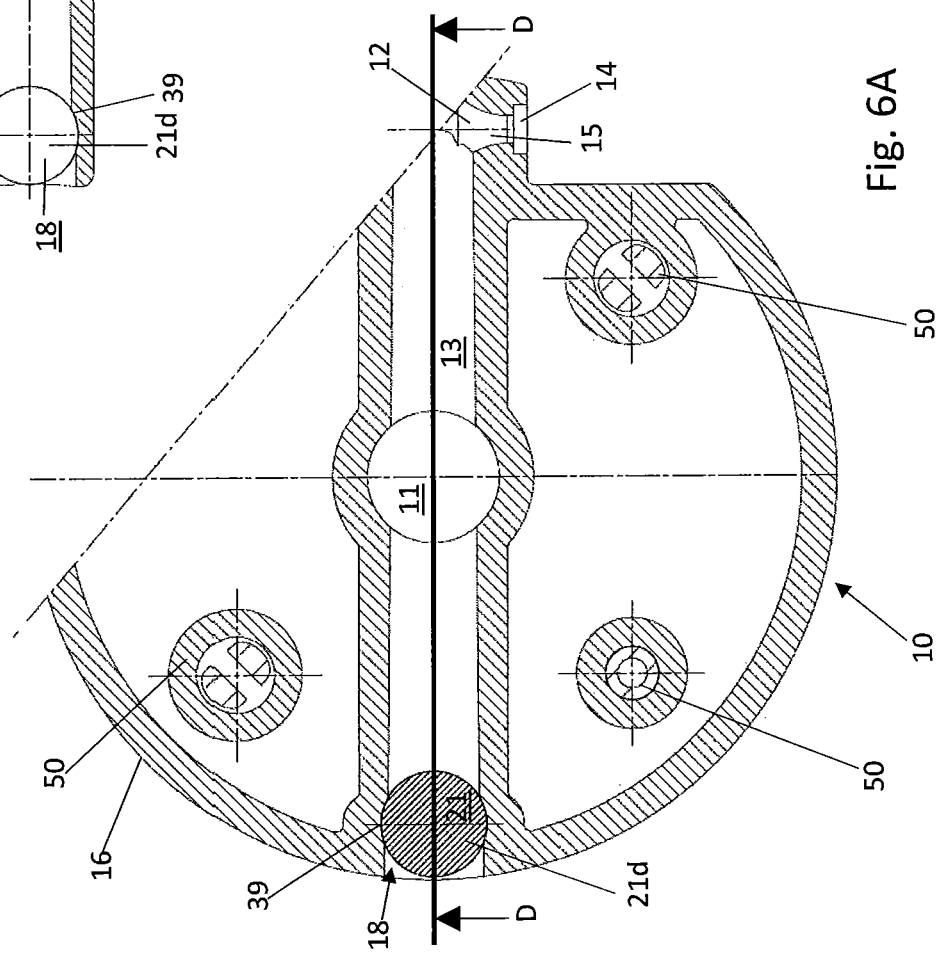

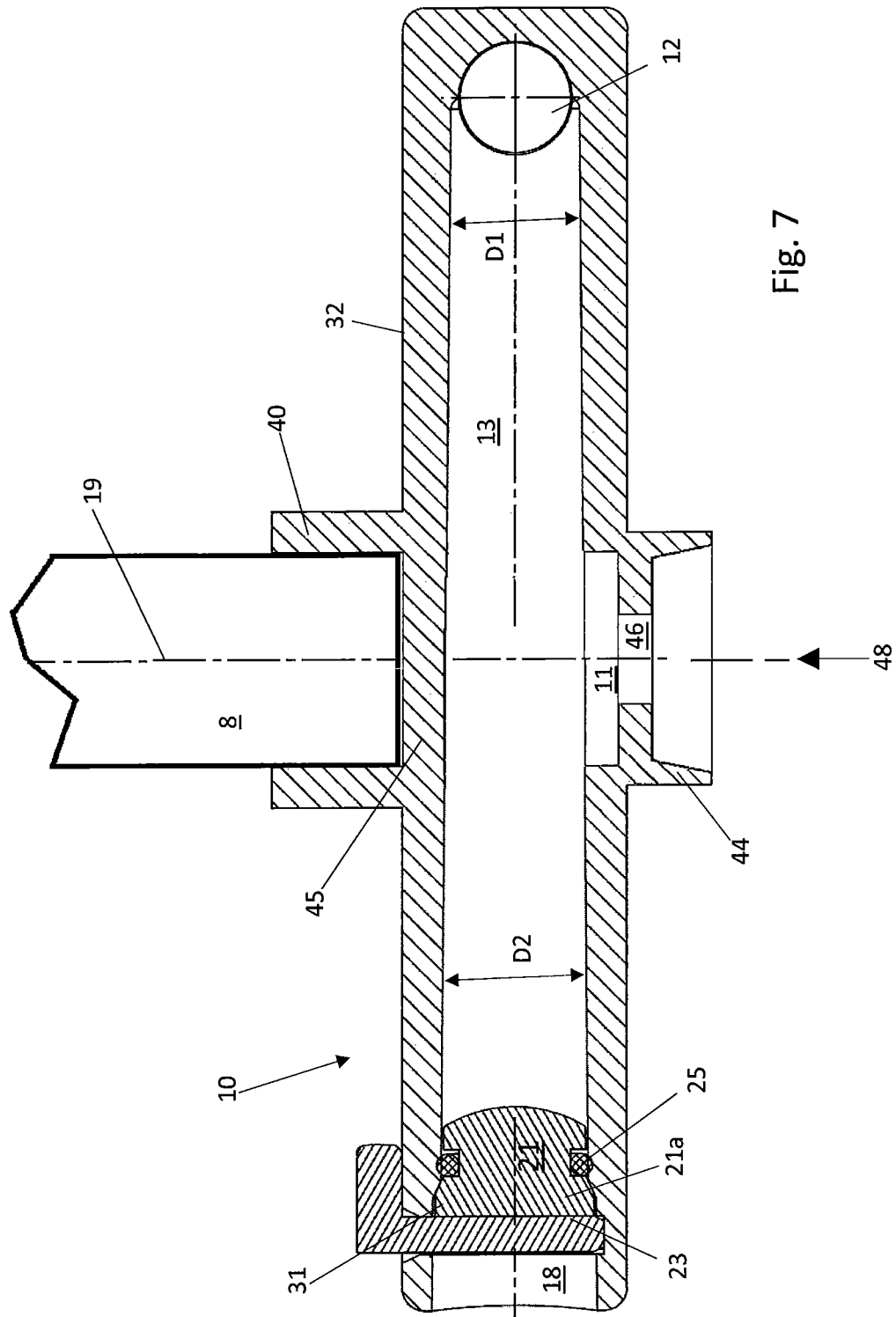

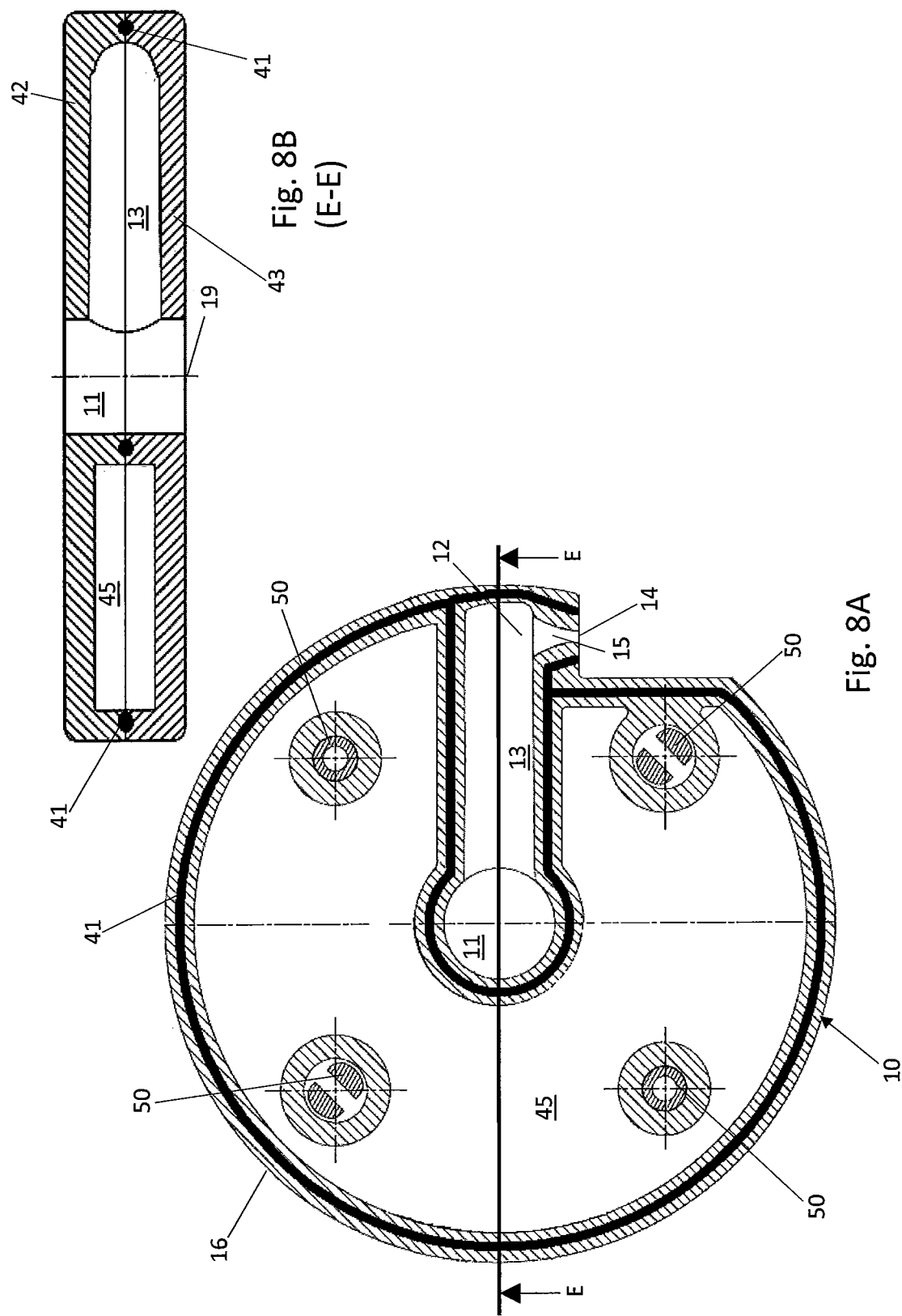

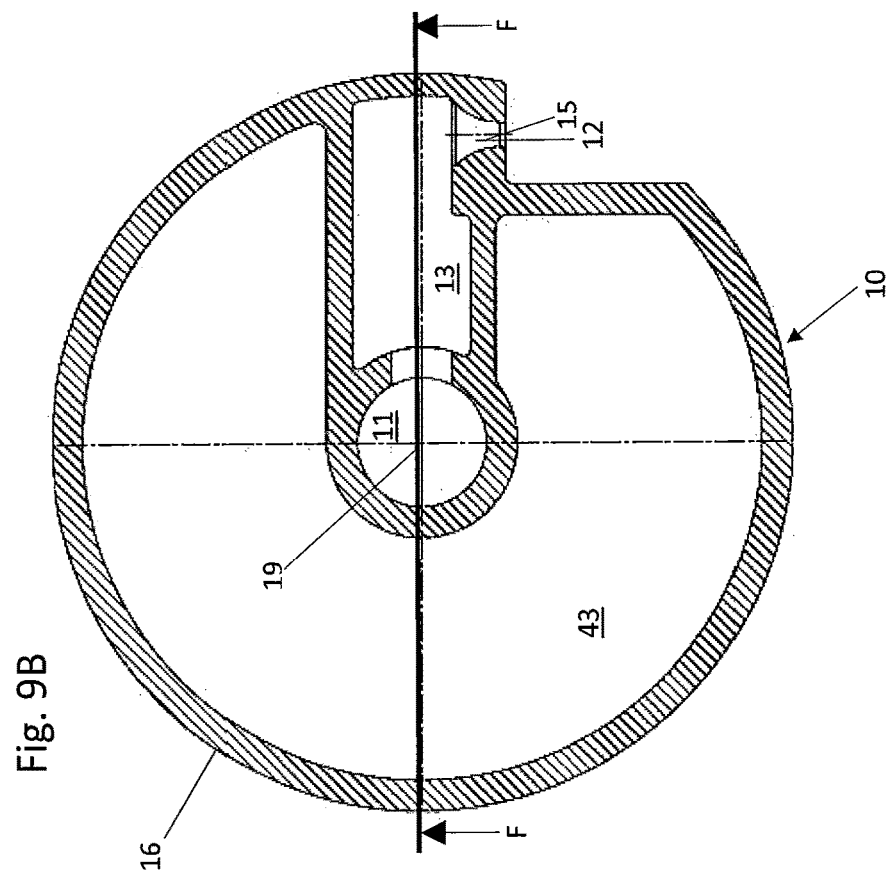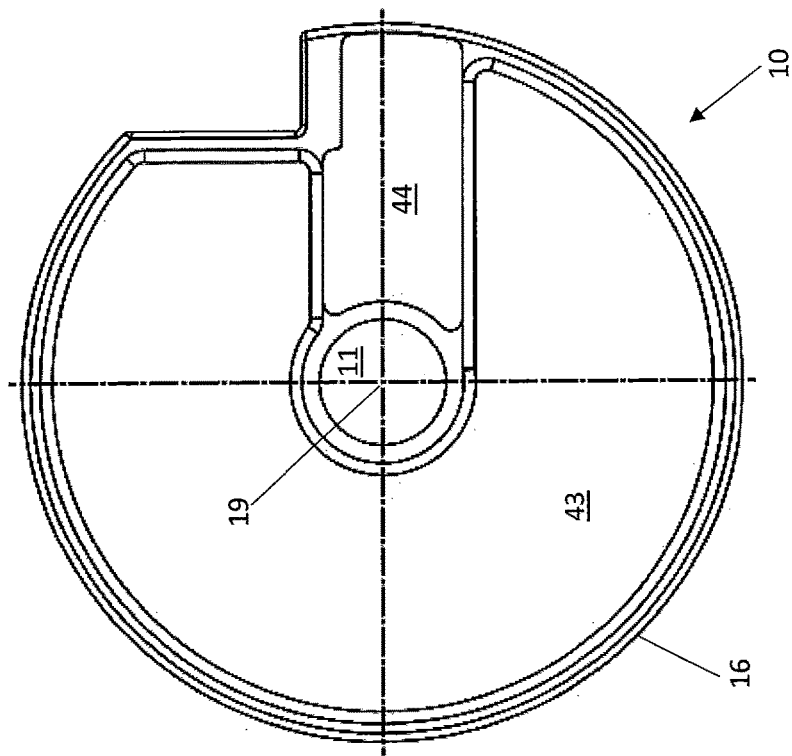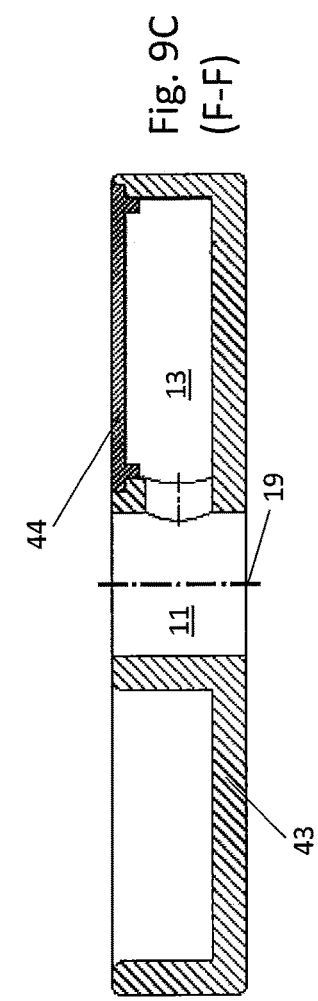

TURBINE AND LIQUID SEPARATOR

BACKGROUND

The present invention relates to a turbine comprising a turbine wheel, as used for example as a drive for active oil separators, and to a liquid separator comprising such a turbine.

In such active oil separators, use is often made of a separating element which is set in rotation in order to ensure a sufficient degree of separation of a liquid out of a gas, for example of oil mist or oil droplets out of blow-by gases of an internal combustion engine.

Such turbines comprise a turbine wheel which is driven by a fluidic drive medium. In the case of oil separators in ventilation systems of internal combustion engines, particularly in the case of vehicles, often the oil pressure of the engine oil is used to drive the turbine wheel. In the case of stationary oil separators, however, a hydraulic drive can also be used.

Such a turbine wheel is coupled to a shaft or is mounted centrally on a shaft and drives said shaft, the latter in turn being coupled to a rotatable separating element. In active oil separators which are customary in the prior art, in which a turbine wheel is driven by means of the oil pressure, the drive fluid is usually conducted through a central bore in the shaft to the turbine wheel and is introduced into the turbine wheel at that point. The turbine wheel has a nozzle on its edge, which nozzle is directed approximately in a tangential direction and through which the fluidic drive medium is discharged. The turbine wheel is set in rotation as a result. Speeds of up to 20,000 rpm are typical.

The term "turbine wheel" is not restricted to an approximately circular element, but rather also encompasses other shapes of bodies capable of rotation.

SUMMARY

Such turbine wheels in the prior art are usually manufactured from stainless steel. This makes the turbine wheel heavy and in particular difficult and expensive to manufacture. The object of the present invention is therefore to provide a turbine wheel and a fluid separator which can be manufactured inexpensively and have a low weight. In particular, the aim is to reduce the complexity of manufacture, to increase the integration potential and to simplify installation of the turbine according to the invention. The aim is also to provide a liquid separator which comprises such a turbine according to the invention.

According to the invention, the turbine comprises a turbine wheel having a first bore which runs in the axis of rotation of the turbine wheel. This first bore can either serve as a central receptacle for a shaft, so that the shaft can be fastened to the turbine wheel, or can run in the extension of the receptacle for such a shaft.

By way of example, the turbine may be injection-moulded onto the shaft, which is usually at least partially made of steel. In another variant, it is also possible to provide the turbine with a receiving geometry for a metal shaft. It is also possible to embed the shaft in the turbine wheel, for example by hot embedding. In addition, a bearing for the shaft may also be provided in this region.

The turbine wheel according to the invention additionally has an inlet for a fluidic drive medium, for example engine oil. This inlet may for example be provided adjacent to the shaft, in particular adjacent to the outlet thereof, in the passage of the shaft through the turbine wheel, so that the drive fluid can be conducted via a central bore of the shaft into the passage region and, from there, can be introduced into the turbine wheel via a lateral bore in the shaft and the inlet according to the invention.

The turbine wheel then additionally has a second bore, which between its two ends extends at least partially along a secant of the turbine wheel and, with regard to its diameter, entirely within the turbine wheel. In other words, as viewed in the direction of the axis of rotation of the turbine wheel and through the turbine wheel, the bore runs at least partially as a secant through the turbine wheel but not through the axis of rotation of the turbine wheel (that is to say not along a diameter of the turbine wheel). The bore therefore passes through the turbine wheel to the side of the axis of rotation thereof.

This bore has an opening at the circumferential edge of the turbine wheel. A fluid nozzle may be arranged in this opening in a conventional manner. The fluid nozzle may for its part be formed directly in one piece with the turbine wheel, in the material of the turbine wheel, so that the turbine contains the fluid nozzle as an integral component. In addition, the turbine wheel has a third bore which extends from the first bore of the turbine wheel, that is to say the central shaft receptacle, to the second bore. This third bore is intended to be arranged in such a way that it enables a fluidic connection between the inlet for the fluidic drive medium and the fluid nozzle in the second bore.

The turbine wheel advantageously has exactly one group of fluid nozzles arranged in the immediate vicinity of one another, in particular exactly one fluid nozzle which is arranged at the outlet of the second bore. In addition, there is advantageously only exactly one second bore. The first, second and third bore form, as a whole, a fluid guide which may be symmetrical with regard to a cross-section through the central plane of the turbine but is otherwise unsymmetrical.

The first bore, second bore and third bore preferably all extend substantially rectilinearly. This is particularly advantageous if the turbine wheel is manufactured by injection moulding, injection-compression moulding and/or pressing. It is also advantageous if the second and third bore run in the same plane in relation to the axial direction of the shaft, or overlap at their transition by at least 50%, preferably 75%, of their extension in the axial direction.

Furthermore, the fluid nozzle is preferably arranged in the second bore in such a way that a direction of discharge of the fluidic drive medium from the fluid nozzle runs substantially perpendicular to the first bore and/or third bore. In individual cases, however, it may be advantageous if the direction of discharge is at an angle of 85 to 95° to the direction of the first bore, that is to say has a small vector component in the axial direction of the shaft. This applies in particular in the case of very high speeds.

This turbine according to the invention, comprising the turbine wheel according to the invention, exhibits a simple and inexpensive design. Since all that is required is to form bores in the body of the turbine wheel, the number of individual parts required in order to manufacture the turbine wheel is very low and thus the complexity of the turbine wheel is greatly reduced in comparison to the prior art.

Many additional functions can easily be integrated in the turbine wheel according to the invention. By way of example, it is possible to provide, on the top side of the turbine wheel, a connection piece which partially holds the shaft so that an improved securing of the shaft in the turbine wheel is achieved. Said connection piece may be manufactured in one piece with the turbine wheel, in particular may be injection-moulded in one piece therewith.

It is also possible to provide, on the top side and/or bottom side of the turbine wheel, a connection piece which enables mounting of the rotating components or which at least partially holds and/or guides the shaft. It is particularly advantageous if a partition wall, in particular a partition wall which is manufactured integrally with the turbine, is provided between the shaft and the first channel of the turbine so that no drive oil can reach the shaft. If such a partition wall is provided, the first channel is then in particular not designed to receive the shaft but rather runs in the extension of the shaft. The drive oil is fed through a conduit section in the connection piece to the first channel and onward to the second channel.

The installation time is also shortened by the turbine wheel according to the invention, and thus the installation costs are also reduced.

In particular, it is advantageous that the turbine wheel can be made in a lightweight construction. To this end, the turbine wheel and/or the housing thereof may for example be largely or entirely made of plastic. Suitable thermoplastics with particular advantage are polyphenylene sulphide (PPS), polyetherimide (PEI), polyimide (PI), polyphthalamide (PPA), polyether ether ketone (PEEK), polyamide (PA), polyamide-imide (PAI), polysulphone (PSU) and/or liquid crystal polymer (LCP), or combinations of the aforementioned materials. They may additionally be reinforced by means of fibres, such as aramid fibres, carbon fibres or glass fibres, and/or other fillers, for example particulate fillers, such as glass beads or mineral-based particles. Suitable fillers are, in particular, calcium carbonate, calcium sulphate, kaolin, mica, talc, and quartz. Use can also be made of thermosetting plastics, such as polyester resins (UP), vinyl ester resins (VE), epoxy resins (EP), phenol resins (PF), and melamine-formaldehyde resins (MF). Such a turbine wheel can be manufactured particularly easily, for example by injection moulding, injection-compression moulding, or pressing. If the turbine wheel is made of a thermosetting material, this can also be achieved by transfer moulding. Manufacturing from metal, preferably lightweight metals, for example aluminium, is also possible. To this end, for example, sinter material can be processed by means of 3D printing.

Manufacturing is particularly easy if the bores do not contain any undercuts, so that the mould can be of simple design.

To enable a simple design of the mould, it is advisable to provide the second bore in such a way that it extends from one circumferential edge to the other circumferential edge of the turbine wheel and thus has two opposite openings on the circumferential edge of the turbine wheel. The third bore can also be created similarly if it extends from a circumferential edge of the turbine wheel to the second bore. The third bore then extends further than would be necessary for the purpose of oil guidance alone; it then has an opening on the circumferential edge at its end opposite to the transition to the second bore. The opening on one side of the bore, which is not required for fluid guidance, can then be closed by a closure means. Suitable closure means are, for example, stoppers which are pressed into the opening and which can be secured by a blade or a slide. Such a blade or such a slide may also be part of another component adjacent to the turbine, or may be configured as an integral extension thereof. It is also advantageous if the blade or the slide is inserted from or through the top side or bottom side of the turbine and is guided at least partially in a groove laterally and/or in the wall opposite the insertion side. A welding of the stopper is also possible; this may optionally be combined with other welding operations for manufacturing the turbine. A screw closure, a bayonet-type closure or a ball inserted with a press fit may also be used to close an opening of the bore. Said closure should advantageously be fluid-tight, so that a closed fluid path is provided in the openings from the fluid inlet via the third bore to the second bore and thus to the fluid nozzle. To this end, the closure means may be combined with a suitable sealing means, for example with an O-ring or a fluid sealing means.

If the turbine wheel is made of plastic, various advantageous embodiments of the turbine wheel can be implemented.

For example, the turbine wheel may be formed of multiple parts, in particular of two half-shells. The half-shells or part-shells may be either two halves of the turbine wheel over in each case 180° of the circumferential edge of the turbine wheel, or else the top side and the bottom side of a turbine wheel. By no means do the two half-shells have to be manufactured identically or as a mirror image of one another. They may also be part-shells which account for different proportions by weight and/or by volume of the turbine wheel as a whole; there may therefore optionally be just one part-shell, wherein it is advantageous if only two part-shells are joined to form a turbine wheel. In the extreme case, one half-shell is merely a flat cover which closes an opening in the other half-shell. A seal, for example a moulded rubber seal, may advantageously be arranged between the individual parts, in particular between the two half-shells of the turbine wheel. Said seal is compressed between the two parts, for example by screwing, welding or clipping the two half-shells together or by joining them to one another in some other way, for example in a manner analogous to a bayonet-type closure.

The turbine wheel may additionally have a housing, within which inter alia the bores (or the walls thereof) and further reinforcing structures, for example reinforcing webs, stiffening ribs and/or balancing elements, may be arranged. Balancing elements may in principle be made of the same material as the housing or the turbine wheel; metal or other elements may also be integrated, for example when this is beneficial for reasons of space and weight. The housing may be formed either in one piece with the turbine wheel or separately from the turbine wheel as a separate component. It is also possible to omit the housing and to manufacture the turbine part exclusively from the walls of the bores and optionally such reinforcing and/or weight-balancing structures. The outer walls of the bores, the reinforcing structures and the housing all serve inter alia also to reinforce the turbine wheel, to establish the correct weight distribution (balancing the turbine wheel), and also to guide the oil for example. The housing, the reinforcing structures and the bores or the walls thereof can therefore be configured differently in terms of their orientation, thickness and shape and the like, depending on the design. In particular, the configuration of the reinforcing webs or stiffening ribs may serve design purposes with regard to noise, vibration and heat distribution (NVH, Noise Vibration Harshness optimization). In addition, a rib structure encourages oil, particularly splashed oil, to agglomerate and run off.

However, the housing may also be formed as a half-shell, for example as a bottom or top (lower part and upper part) of the turbine wheel. The housing may in this case advantageously have a smooth and/or closed surface.

Particularly when using a turbine wheel made of plastic or substantially made of plastic, further functional elements, such as a magnet for example, may be embedded in the turbine wheel. By means of such an embedded magnet, it is possible for example to detect the rotational speed of the turbine wheel. In addition, a sliding bearing may be cast into the turbine wheel so that the turbine wheel can be mounted, together with or separately from the shaft, with little friction in an oil separator. The use of plastic also makes it possible to injection-mould the turbine wheel directly onto the shaft, for example to injection-mould it in a media-tight manner onto a steel shaft. A sealing by means of additional sealing elements, such as O-rings for example, is possible in addition or as an alternative.

In particularly advantageous embodiments, at least the walls which directly surround the second and third bore, including the discharge nozzle, are formed entirely of plastic, in particular of fibre-reinforced plastic.

Some examples of turbines according to the invention and of liquid separators according to the invention will be given below. The following examples include, besides the features necessary according to claim 1, a large number of optional developments which may serve individually, or in any combination, and also in combination with one or more optional features of other examples, to develop the turbine according to the invention and the liquid separator according to the invention.

BRIEF DESCRIPTION OF THE DRAWINGS

Hereinbelow, identical or similar reference signs will be used for identical or similar components in the individual examples, and therefore the description of said reference signs will not always be repeated. In the figures:

FIGS. 2A-2F show a first exemplary embodiment of a turbine according to the invention, FIGS. 4A, 4B show a turbine according to the invention according to a third exemplary embodiment, FIGS. 5A-5D show a turbine according to the invention according to a fourth exemplary embodiment, FIGS. 6A, 6B show a turbine according to a fifth exemplary embodiment, FIG. 7 shows a turbine according to a sixth exemplary embodiment, FIGS. 8A, 8B show a turbine according to a seventh exemplary embodiment, FIGS. 9A-9C show a turbine according to an eighth exemplary embodiment.

DETAILED DESCRIPTION

Figure 1:
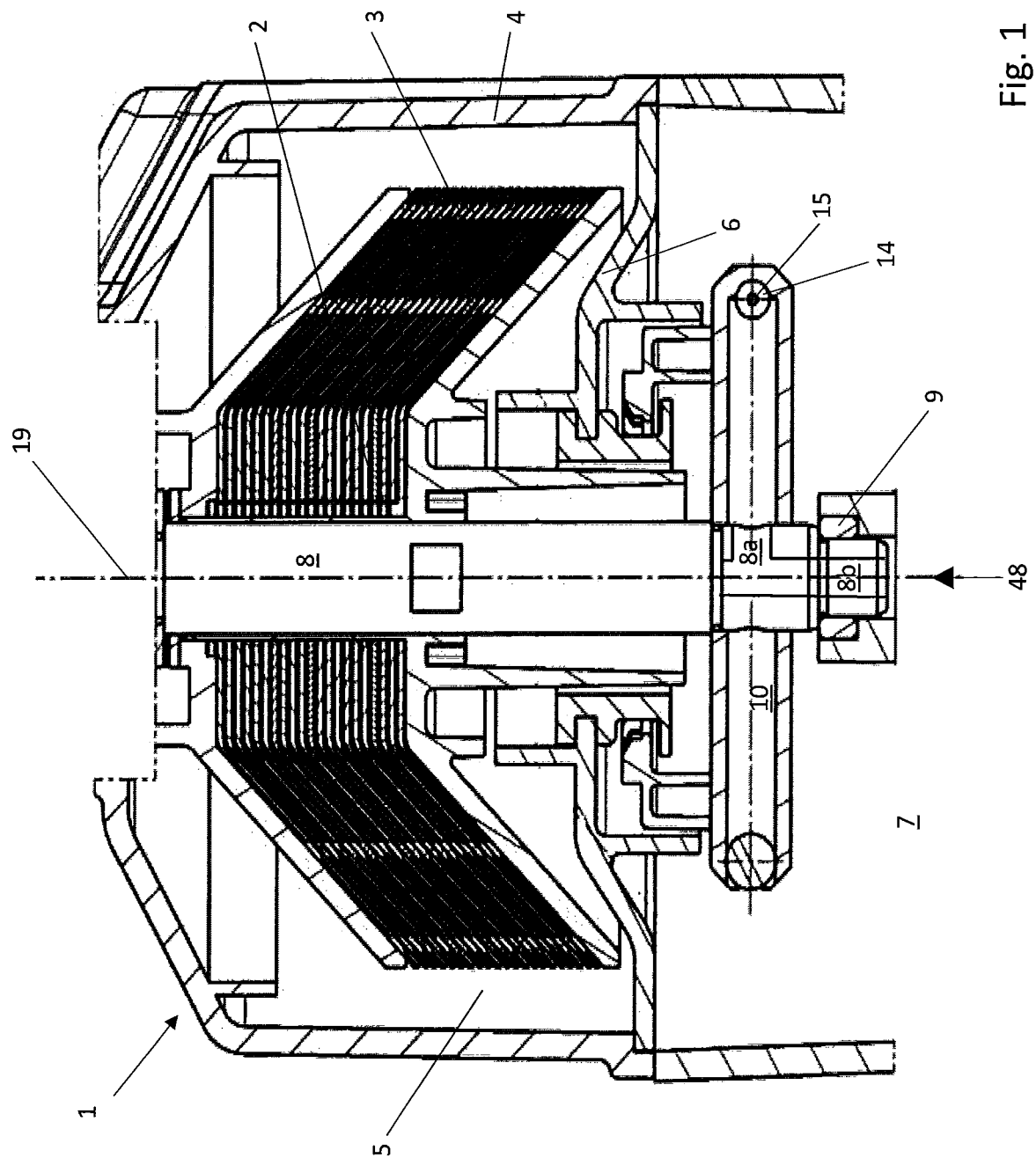
FIG. 1 shows a vertical section through a liquid separator according to the invention.

FIG. 1 shows a vertical section through a liquid separator 1 according to the invention. The liquid separator 1 has a housing 4, which is divided into a drive chamber 7 and a separation chamber 5. The drive chamber 7 and the separation chamber 5 are separated from one another by a partition wall 6. A disc separator 2 is arranged in the separation chamber 5, said disc separator having a plurality of discs 3 stacked one above the other as separating elements. The disc separator 2 is fastened, in the axis of rotation thereof, to a shaft 8. The shaft 8 extends into the drive chamber 7 through an opening in the partition wall 6. In the drive chamber 7, the shaft 8 is rotatably mounted on a bearing 9. In the drive chamber 7, a turbine 10 is also fastened to the shaft 8.

The turbine 10 drives the disc separator 2 by means of a drive fluid, such as engine oil for example. When the liquid separator 1 is operated as an oil separator in an internal combustion engine, engine oil flows as the drive fluid through a central bore 8b in the interior of the shaft 8. The arrow 48 indicates the direction in which the engine oil is supplied. In the region of the turbine 10, the engine oil passes from the shaft 8 into the turbine 10 via a lateral bore 8a in the shaft 8, is conducted to the circumferential edge of the turbine due to the rotation of the turbine wheel, and is discharged again through a fluid nozzle 15 which is directed approximately in a tangential direction. The turbine wheel is set in rotation as a result, and the disc separator 2 fixedly connected to the turbine 10 is thereby driven via the shaft 8.

Figures 2A, 2B:
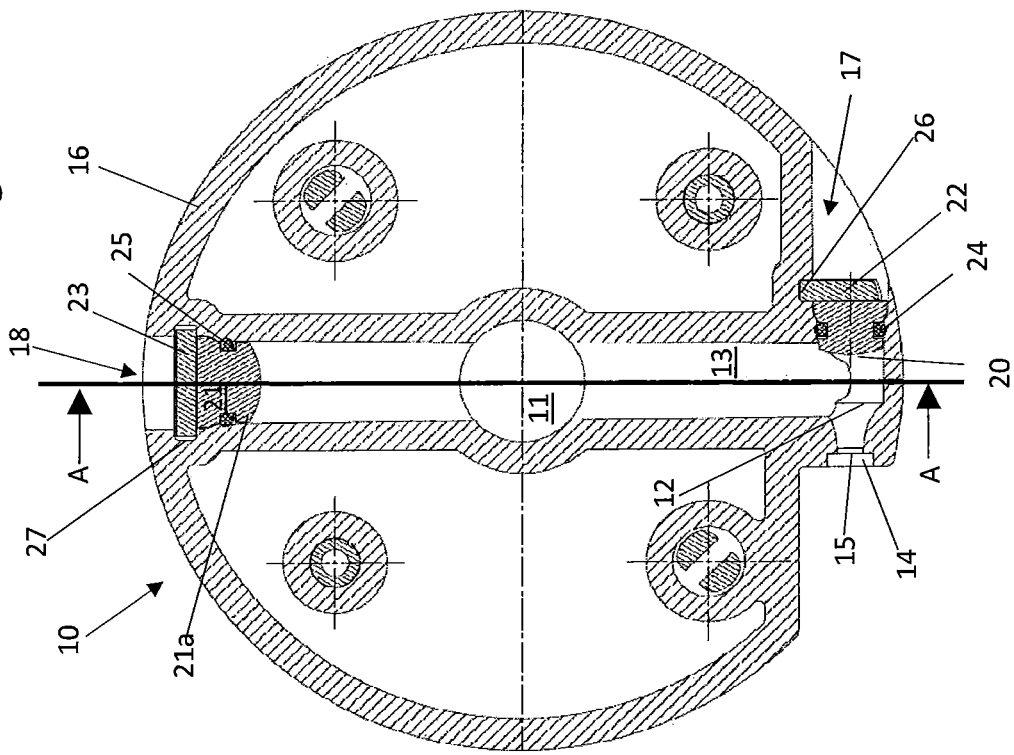

FIGS. 2A to 2F show a first exemplary embodiment of a turbine according to the invention, in two horizontal sectional views (2A, 2B), a vertical sectional view along the line A-A (2C), a side view (2D), a bottom view (2E), and a top view (2F). The turbine 10 is of substantially rotationally symmetrical shape and has a first bore 11 in its axis of rotation, a second bore 12 along a secant, and a third bore 13 which extends from the circumferential edge 16 to the second bore 12, thereby intersecting the first bore 11. The second bore has a first opening 14, in which a fluid nozzle is arranged. The third bore 13 has a third opening 18 at an end opposite to the first opening 14. The second bore 12 has a second opening 17 at an end opposite to the fluid nozzle 15. In FIG. 2A, none of these openings 14, 17, 18 are closed. The second and third opening 17 and 18 result from the manufacturing process, in which the entire turbine wheel 10 is manufactured as a one-piece component, slides being pulled out of the turbine wheel 10 via the second opening 17 and the third opening after the turbine wheel has been formed. In order to obtain a closed fluid path, the second opening 17 and the third opening 18 must subsequently be closed. To this end, a stopper 21a is inserted as a closure element 21 in the third opening 18, said stopper being secured by means of a blade 23. The blade 23 engages in recesses 27 which are formed in the wall of the third bore 13. A seal 25 is additionally arranged between the stopper 21 and the wall of the third bore 18. The second opening 17 is likewise closed by a stopper 20, which is secured by a blade 22. The blade 22 engages laterally in just one recess 26, which is formed in the wall nearest to the first bore. A seal 24 is additionally arranged between the stopper 20 and the wall of the bore.

FIG. 2C shows, in vertical section, the turbine 10 with an impeller 49 (shown in simplified form) fastened to the top side of the turbine. The impeller 49 serves, for example, to generate a vacuum and/or as an element of the sealing system. Furthermore, a slot 31 for the blade 23 of the third opening 18 is provided in the cover on the top side. FIG. 2D shows a side view of the turbine 10 with the impeller 49, wherein here the blade 23 is manufactured in one piece with the impeller 49. As can be seen from FIG. 2A, this impeller 49 is fastened to the top side of the turbine 10 via the centring and fastening devices 50.

FIG. 2E shows a view of the bottom side of the turbine 10. FIG. 2F shows a top view of the turbine 10. The turbine 10 is equipped with a substantially closed covering wall 32 on a top side. A respective slot 30 and 31 for the blades 22 and 23 is located at the second opening 17 and third opening 18. Furthermore, the impeller 49 adjacent to the nozzle 15 protrudes slightly beyond the top side of the turbine 10.

Figure 3:
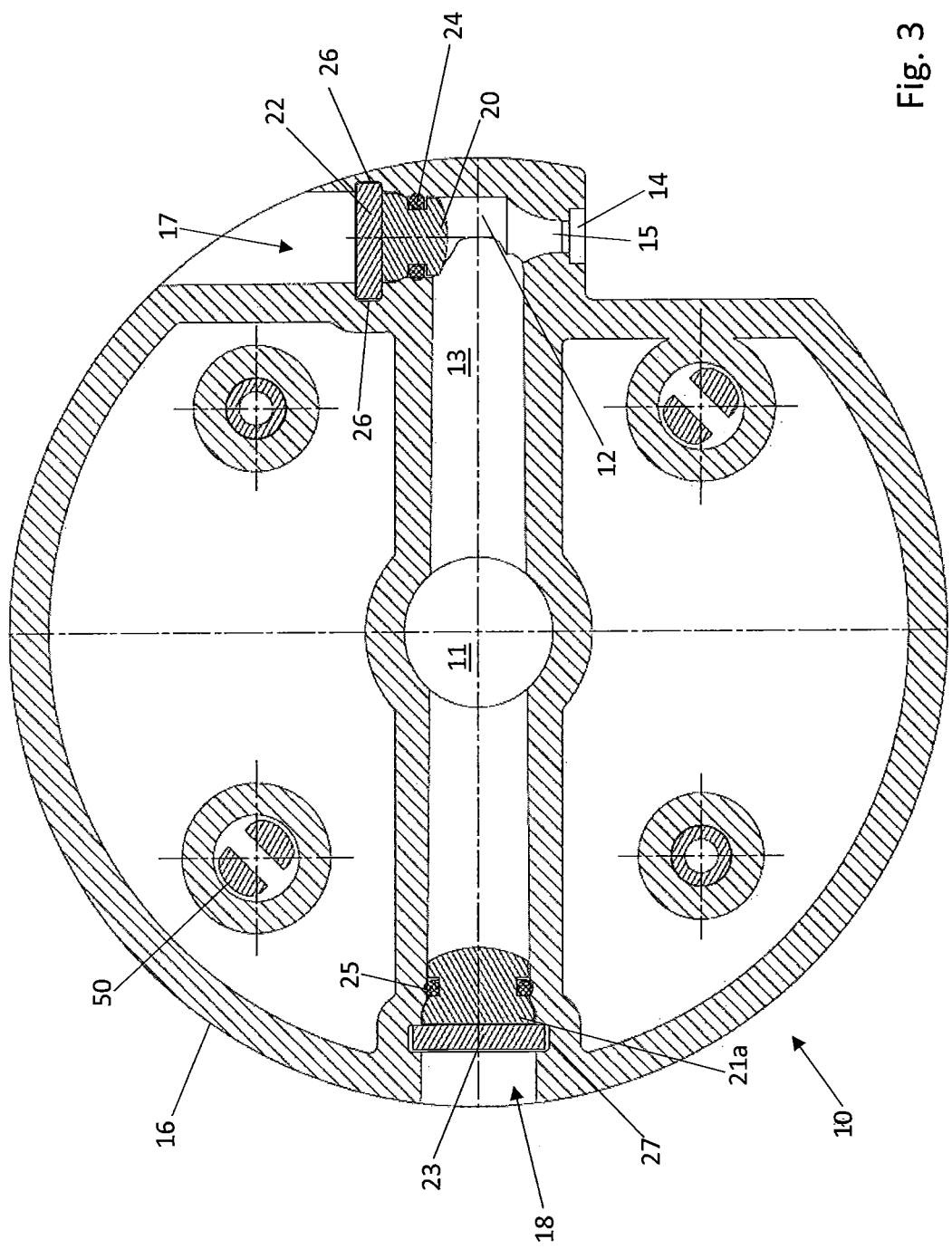
FIG. 3 shows a second exemplary embodiment of a turbine according to the invention.

FIG. 3 shows a second exemplary embodiment of the turbine 10 according to the invention, in a horizontal sectional view. In a manner differing from the first exemplary embodiment, the second bore 12 in this second exemplary embodiment is shorter, so that the blade 22 of the closure of the second opening 17 can also engage in a recess 26 in the wall of the bore 12 on the side facing towards the circumferential edge 16 of the turbine 10.

FIGS. 4A and 4B show a third exemplary embodiment of the turbine 10 according to the invention, in which the turbine wheel or the plastic body of the turbine wheel is made of carbon-fibre-reinforced PPS. FIG. 4A shows a horizontal section. FIG. 4B shows a vertical section along the line B-B. In a manner differing from the first and second exemplary embodiment, the second opening and the third opening 18 are closed by a closure element 21, namely by a stopper 21b with a bayonet fitting 34, which engages in a receiving geometry 33. The closure element 21 of the third opening 18 closes the third opening 18 directly at the first bore 11 and thus forms an anti-rotation means for the shaft both in the axial direction and in the radial direction.

FIGS. 5A to 5D show a fourth exemplary embodiment of a turbine 10 according to the invention, in a horizontal section, a vertical section, a top view, and a bottom view. Besides the choice of material (a glass-fibre-reinforced polyamide is used here), the fifth exemplary embodiment differs only in the closure mechanism for the second opening 17 and third opening 18. As the closure element 21, here a screw 21c having a thread 36 is screwed into the third opening 18 and second opening 17 and forms the thread 35 in the bore as it is being screwed in. A seal 25 is additionally arranged between the screw 21c and the wall of the bore. The closure for the second opening 17 takes place in the same way as that shown in FIGS. 5A and 5B for the third opening 18. On the top side, the turbine has a substantially closed cover 32, as can be seen from FIG. 5C. FIG. 5D shows that longitudinal and transverse ribs 38a and 38b are arranged in a lattice-like manner on the bottom side. A substantially circumferential rib 37 is additionally arranged at the circumferential edge 16 on the bottom side of the turbine 10. The ribs serve primarily to reinforce the turbine 10. However, by arranging the ribs irregularly in a certain way, it is also possible to compensate an imbalance of the turbine or to reduce the noise produced. In addition, the structure encourages oil to agglomerate and run off.

FIGS. 6A and 6B show a fifth exemplary embodiment of the turbine 10 according to the invention, in a horizontal and a vertical sectional view. The fifth exemplary embodiment differs from the preceding exemplary embodiments in the closure mechanism for the second opening 17 and third opening 18. Here, the second opening 17 and third opening 18 are closed by a ball 21d as a closure element 21 with a press fit 39. This creates a depression in the wall of the bore 12, 13, as a result of which the ball 21d is securely seated. The second opening 17 is closed in a manner analogous to that shown for the third opening 18.

As already indicated, the groups of FIGS. 4 to 6 are simplified such that only the closure of the third opening 18 is explicitly shown. The second opening 17 is in each case closed in an identical manner, optionally with deviations in respect of the dimensions.

FIG. 7 shows a sixth exemplary embodiment of a turbine 10 according to the invention, in a vertical sectional view. This differs from the first exemplary embodiment firstly by the lack of an impeller, so that the blade 23 is also formed as a separate component. In addition, the two double-headed arrows serve to illustrate that the height and diameter of the third bore 13 D1 in the region between the first bore 11 and the second bore 12 is smaller than the height and diameter of the third bore 13 D2 in the region between the first bore 11 and the closure element 21.

Here, the shaft 8 does not extend through the turbine 10 as in FIG. 1, but rather ends in a connection piece 40 on the top side of the turbine wheel 10 and is fastened therein for example with a form fit (not shown). The shaft is thus separated from the first channel 11 by a partition wall 45. The turbine 10 is mounted via a connection piece 44 which protrudes on the bottom side. The oil enters the first channel 11 through an opening 46 on the bottom side of the turbine wheel, said opening being arranged centrally in relation to the connection piece 44. This is often advantageous with regard to the sealing between the drive chamber 7 and the separation chamber 5.

FIGS. 8A and 8B show a seventh exemplary embodiment of a turbine 10 according to the invention, in a horizontal and a vertical sectional view. The turbine 10 is divided into an upper shell 42 and a lower shell 43 and has a sealing element 41 between the shells 42 and 43. The sealing element 41 is arranged along the circumferential edge 16 and also along the walls of the bores 11, 12 and 13. In a manner differing from the preceding exemplary embodiments, here the third bore 13 does not extend from circumferential edge 16 to circumferential edge 16, that is to say does not extend along the entire diameter, but rather extends only from the first bore 11 to the second bore 12.

A third bore 13 that runs along the entire diameter is not necessary here due to the fact that there is an upper shell 42 and a lower shell 43, since the mould can form the individual half-shells separately. It is also not necessary here for the second bore 12 to extend along the entire length of a secant through the turbine 10. Instead, the second bore 12 is limited to a short passage between the third bore 13 and the fluid nozzle 15. The turbine 10 has a cavity 45 in the interior. This results in a saving in terms of material and weight. Reinforcing ribs, which also serve to achieve a balanced weight distribution in the cavity 45, have not been shown.

FIGS. 9A to 9C show an eighth exemplary embodiment of the turbine 10 according to the invention, in a top view, in a horizontal sectional view, and in a vertical sectional view. As in the preceding exemplary embodiment, the third bore 13 extends only from the first bore 11 to the second bore 12. Furthermore, the turbine 10 has only a lower shell 43 and a partial cover 44 in the region above the third bore 13 and the second bore 12. This can likewise result in a saving in terms of weight and material on the turbine 10. The lower shell 43 and the cover are joined here in a permanent fashion by means of hot gas welding.

Figure 10A:
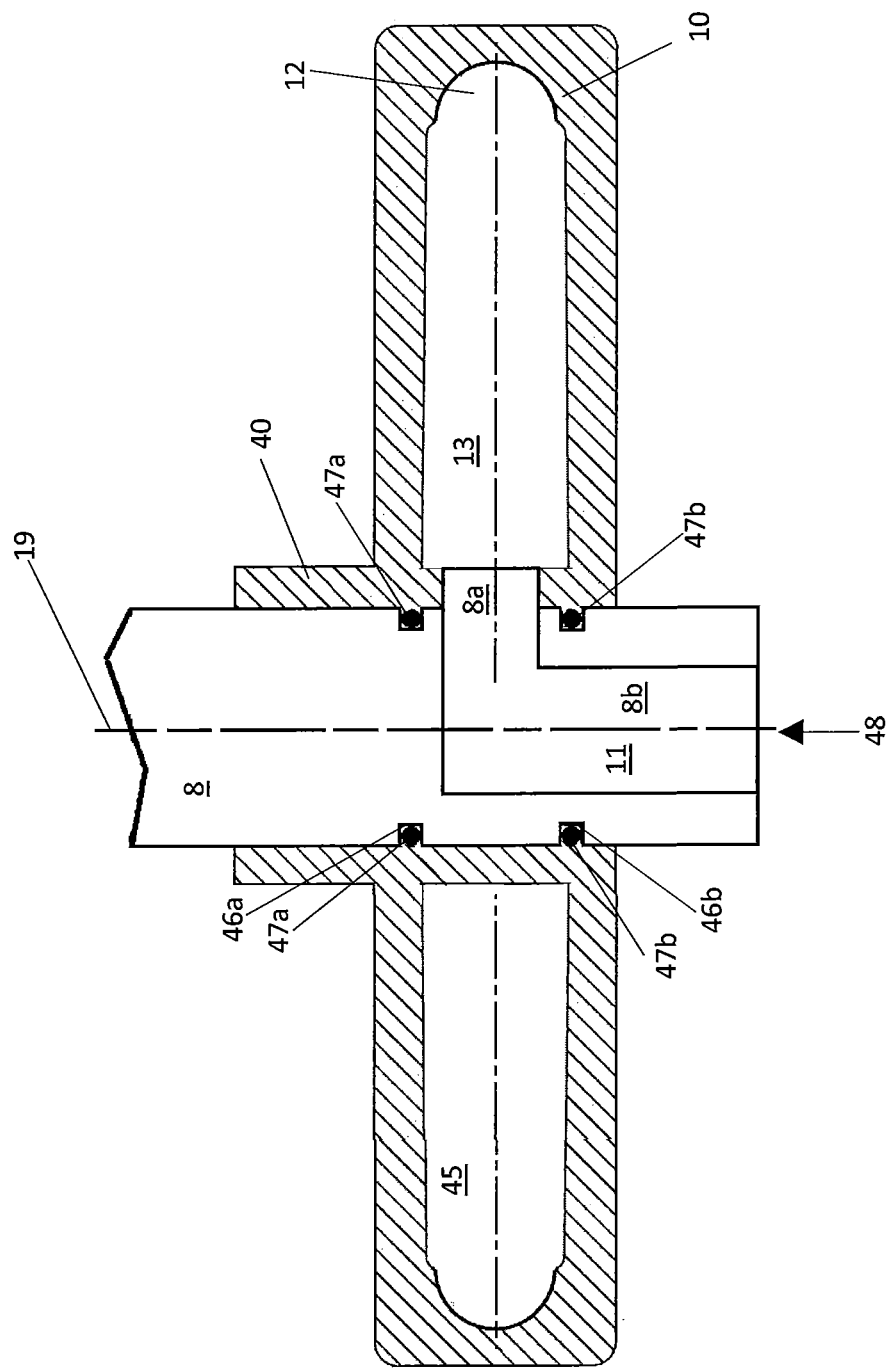
FIGS. 10A, 10B show a turbine according to a ninth exemplary embodiment.
Figure 10B:
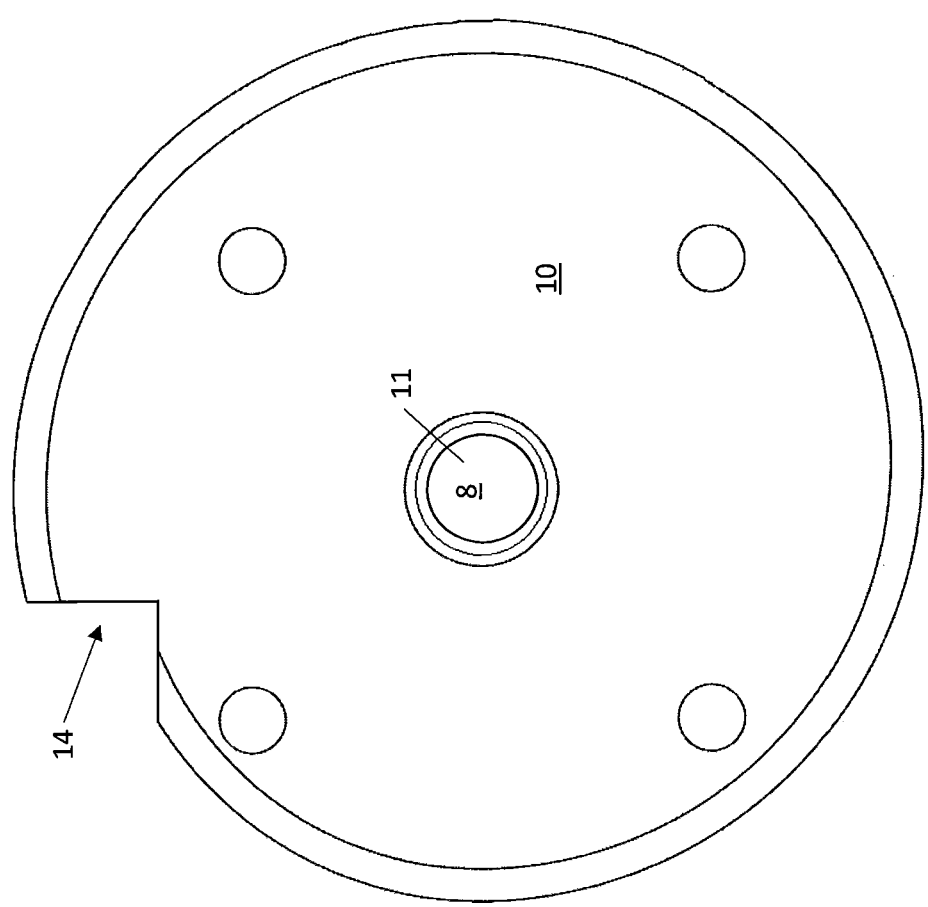

FIG. 10 shows a ninth exemplary embodiment of the turbine 10 according to the invention, in a vertical sectional view (FIG. 10A) and in a top view (FIG. 10B). Here, the shaft 8 is injection-moulded directly into the plastic body of the turbine 10 or is overmoulded with the plastic body of the turbine 10 and thus is accommodated in the first channel 11. The shaft 8 has two annularly running grooves 46a, 46b on its outer surface in the region of the turbine 10, an O-ring 47a, 47b being accommodated in each of said grooves. In the case of overmoulding, the grooves 46a, 46b are not only filled but are pressed onto the O-rings 47a, 47b so that a sealed connection is achieved between the turbine 10 and the shaft 8. The central bore 8b of the shaft 8 is also shown here, through which the engine oil is introduced in the direction 48. Here, the central bore 8b is located in the region of the first bore 11. The engine oil enters the third bore 13 via the opening 8a in the side wall of the shaft 8.

FIG. 10B shows that the outer contour of the turbine 10 differs from the outer contour of the preceding exemplary embodiments. While in the preceding exemplary embodiments a substantially circular outer geometry was selected, apart from the cutout at the outlet of the nozzle 15, here a spiral-shaped geometry is used, that is to say that the outer circumferential line of the turbine 10 runs inward in the manner of a spiral. This also results in an off-centre arrangement of the shaft 8 and of the first bore 11.

The invention claimed is:

1. A turbine comprising a turbine wheel, the turbine wheel having:
 a first bore which runs in an axis of rotation of the turbine wheel, and an inlet for a fluidic drive medium,
 a second bore which, in a top view of the turbine wheel, runs at least partially along a secant and not through the axis of rotation of the turbine wheel,
 a third bore which extends at least from the first bore to the second bore and which is fluidically connected to the inlet, wherein the second bore has a first opening at the circumferential edge of the turbine wheel, in which a fluid nozzle is arranged, and wherein the second bore, at the end thereof located opposite the first opening, and or the third bore, on a side of the first bore opposite to the second bore, extends as far as the circumferential edge and has there a further opening in the circumferential edge of the turbine wheel, said further opening being closed in a fluid-tight manner by a closure including a stopper, a screw, a stopper with a bayonet fitting, or a ball, and
 a housing made of or containing plastic, including fibre-reinforced and/or filler-filled plastic.

2. The turbine according to claim 1, wherein the first bore, second bore and third bore extend substantially rectilinearly.

3. The turbine according to claim 1, wherein a direction of discharge of the fluidic drive medium from the fluid nozzle runs substantially perpendicular to the first bore and/or third bore.

4. The turbine according to claim 1, wherein the fluid nozzle is integrally formed in one piece in the turbine wheel.

5. The turbine according to claim 1, wherein the turbine wheel is formed of two half-shells which, in order to form the turbine wheel, are joined together along a plane that is transverse to the axis of rotation of the turbine wheel or transverse to the direction of extension of the second bore.

6. The turbine according to claim 1, an impeller or a sealing element as further functional components, is arranged on a top side of the turbine wheel.

7. The turbine according to claim 1, wherein reinforcing webs and/or stiffening ribs are located outside of the bores.

8. The turbine according to claim 1, wherein the turbine wheel has a housing, wherein reinforcing webs and/or stiffening ribs as reinforcing structures, are arranged within the housing.

9. The turbine according to claim 1, wherein the turbine wheel is made of or contains fibre-reinforced and/or filler filled plastic.

10. The turbine according to claim 9, wherein the plastic is or contains polyphenylene sulphide (PPS), polyetherimide (PEI), polyimide (PI), polyphthalamide (PPA), polyether ether ketone (PEEK), polyamide (PA), polyester resin (UP), vinyl ester resin (VE), epoxy resin (EP), phenol resin (PF), melamine-formaldehyde resins (ME), or a combination of the aforementioned materials.

11. The turbine according to claim 9, wherein one or more of the following types of fibre are used as reinforcing fibres: carbon fibres, glass fibres, polyester fibres, aramid fibres.

12. The turbine according to claim 1, wherein the turbine wheel and/or a housing thereof can be partially or entirely manufactured by an injection moulding, injection-compression moulding and/or transfer moulding process and/or by pressing.

13. A liquid separator for separating liquid droplets and/or liquid mist, including oil droplets and/or oil mist, out of a gas, including blow-by gases of an internal combustion engine, comprising a rotatably mounted separating element and a drive element for rotatably driving the separating element, wherein the drive element comprises a turbine according to claim 1.

* * * * *